United States Patent [19]
Ganzel et al.

[11] Patent Number: 6,022,085
[45] Date of Patent: Feb. 8, 2000

[54] SUPPLY VALVE FOR VEHICULAR BRAKING SYSTEM

[75] Inventors: Blaise J. Ganzel, Ann Arbor; Ronald L. Sorensen, Erie, both of Mich.

[73] Assignee: Kelsey-Hayes Co., Livonia, Mich.

[21] Appl. No.: 08/925,804

[22] Filed: Sep. 9, 1997

Related U.S. Application Data

[60] Provisional application No. 60/025,678, Sep. 9, 1996.

[51] Int. Cl.[7] ........................................................ B60T 8/34
[52] U.S. Cl. ........................ 303/113.2; 303/901; 137/112
[58] Field of Search ............................. 303/901, DIG. 1, 303/DIG. 2, 84.2, 113.2; 137/112, 854

[56] References Cited

U.S. PATENT DOCUMENTS

| | | | |
|---|---|---|---|
| 5,552,651 | 9/1996 | Sorensen | 303/113.5 |
| 5,681,098 | 10/1997 | Ganzel et al. | 303/119.2 |
| 5,741,049 | 4/1998 | Sorensen | 303/113.5 |
| 5,882,090 | 3/1999 | Ganzel | 303/113.2 |
| 5,884,985 | 3/1999 | Ganzel et al. | 303/113.2 |

*Primary Examiner*—Mark T. Le
*Assistant Examiner*—Robert Siconolfi
*Attorney, Agent, or Firm*—MacMillan, Sobanski & Todd, LLC

[57] ABSTRACT

A supply valve for use in a vehicular braking system includes a housing. A sleeve is disposed within a bore in the housing. A piston is slidably disposed within the bore. A valve element is disposed within the sleeve and includes a valve seat and check element for sealing against the valve seat to close the valve element. A lip seal is disposed on the sleeve for allowing fluid to flow from a low pressure accumulator to a pump, but not in the opposite direction. The supply valve is particularly adapted for use in an anti-lock braking system equipped with traction control.

16 Claims, 3 Drawing Sheets

SUPPLY VALVE FOR VEHICULAR BRAKING SYSTEM

CROSS-REFERENCE TO RELATED APPLICATION

This application claims the benefit of United States provisional patent application identified as Application No. 60/025,678, filed Sep. 9, 1996.

BACKGROUND OF THE INVENTION

This invention relates in general to vehicular braking systems, and in particular a supply valve for use in an ant-lock braking system (ABS) including traction control (TC).

Vehicles are commonly slowed and stopped with hydraulic braking systems. These systems vary in complexity but a base brake system typically includes a tandem master cylinder, pressure fluid conduit arranged in two similar but separate brake circuits, and wheel brakes in each circuit The master cylinder generates hydraulic forces in both brake circuits by pressurizing brake fluid when the driver steps on the brake pedal. The pressurized fluid travels through the pressure fluid conduit in both circuits to actuate wheel brakes and slow the vehicle.

Base braking systems typically use a brake booster to provide a force to the master cylinder which assists the pedal force created by the driver. The booster can be vacuum or hydraulically operated. A hydraulic booster uses pressurized fluid in a brake booster to move the master cylinder piston, thereby increasing the master cylinder pressures generated when the driver applies the brakes. Hydraulic boosters are commonly located adjacent the master cylinder piston and use a boost valve to control the pressurized fluid applied to the booster. Typically the boost valve is connected with the booster in the master cylinder assembly and mechanically coupled to the brake pedal for proper operation Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of ABS. An anti-lock brake system monitors wheel rotational behavior and selectively applies and relieves brake pressure in the corresponding wheel brakes in order to maintain the wheel speed within a selected slip range while achieving maximum braking forces. While such systems are typically adapted to control the braking of each braked wheel of the vehicle, some systems have been developed for controlling the braking of only a portion of the braked wheels.

Electronically controlled ABS valves, comprising isolation valves and dump valves, are located between the master cylinder and the wheel brakes and perform the pressure regulation. Typically, when activated, these ABS valves operate in three pressure control modes: pressure apply, pressure dump and pressure hold. The isolation valves allow brake pressure into the wheel brakes to increase pressure during the apply mode, and the dump valves release pressure from the wheel brakes during the dump mode. Wheel brake pressure is held constant during the hold mode.

A further development in braking technology has led to the introduction of TC systems. Additional valves have been added to existing anti-lock braking systems to provide a braking systems which control wheel speed during acceleration. Excessive wheel speed during vehicle acceleration leads to wheel slippage and a loss of traction. An electronic control system senses this condition and automatically applies braking pressure to the wheel brakes of the slipping wheel to reduce the slippage and increase the traction available. In order to achieve optimal vehicle acceleration, braking pressures greater than the master cylinder pressure must quickly be available when the vehicle is accelerating.

A multiplicity of control valves and hydraulic components are used in ABS/TC systems, and are typically housed in a hydraulic control unit (HCU). The HCU includes a housing having a plurality of bores in which the control valves and hydraulic components are seated. Passageways or conduits are drilled into the HCU to provide fluid communication between the various valves and components.

It is desirable to combine functions of traditional valves and hydraulic components into a single, integrated assembly. Such integrated assemblies reduce the cost of manufacturing the various components and the HCU, and also reduce the size and weight of a ABS/TC system.

SUMMARY OF THE INVENTION

This invention relates to a supply valve in a vehicular braking system for hydraulically actuated wheel brakes. A normally open supply valve integrates a check valve function by using a lip seal. The lip seal permits fluid to pass from a low pressure accumulator to a pump inlet when the supply valve is closed. The supply valve can be utilized in various braking systems, including those with ABS and TC.

In a preferred embodiment, a supply valve for use in a vehicular braking system includes a housing A sleeve is disposed within a bore in the housing A piston is slidably disposed within the bore. A valve element is disposed within the sleeve and includes a valve seat and check element for sealing against the valve seat to close the valve element. A lip seal is disposed on the sleeve for allowing fluid to flow from a low pressure accumulator to a pump, but not in the opposite direction.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
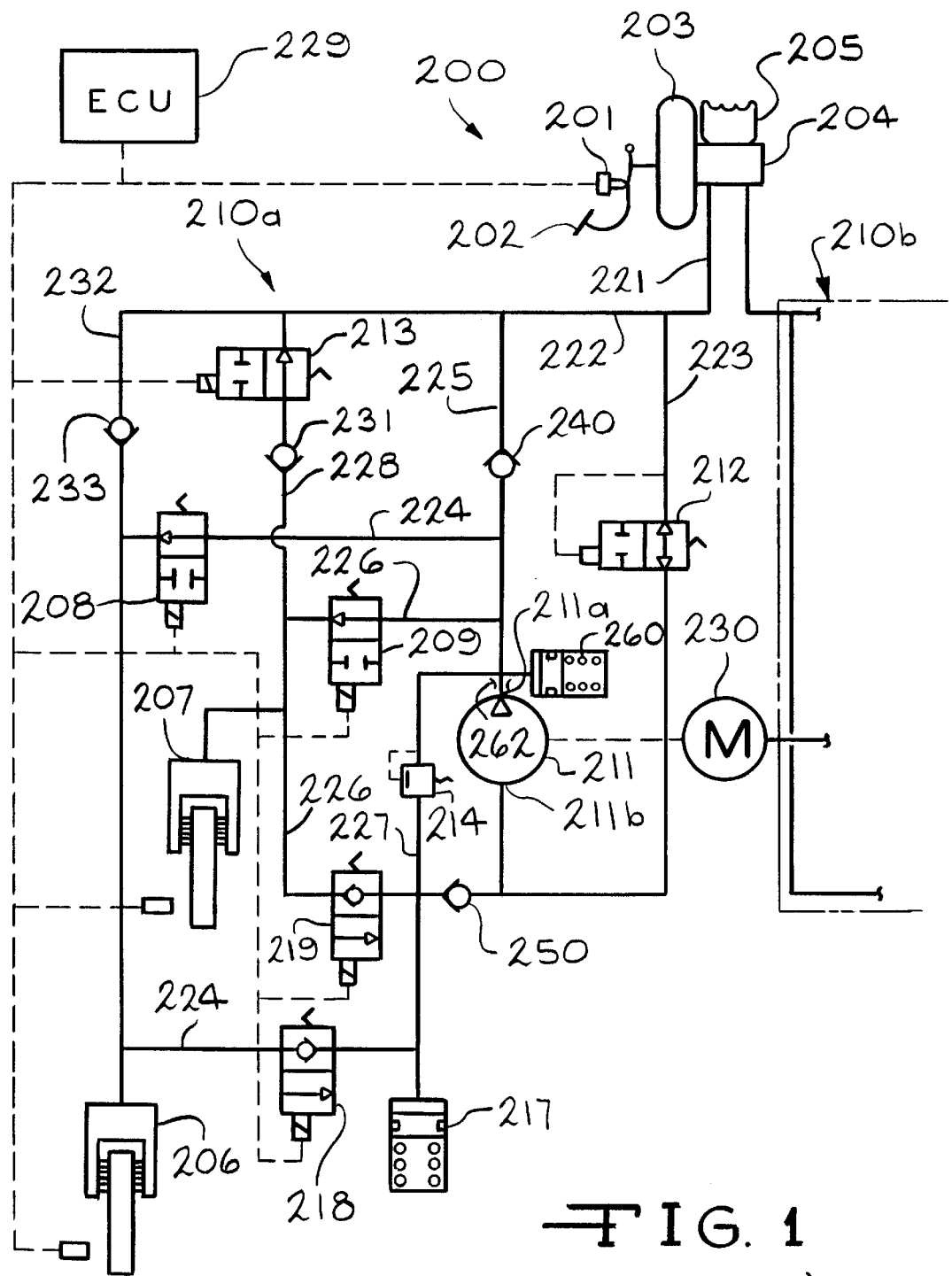
FIG. 1 is a schematic diagram of a conventional vehicular braking system having anti-lock and traction control capabilities.

FIG. 1 illustrates a pedal-isolated ABS/TC braking system 200 which is known in the art. A brake pedal 202 is connected to a booster 203 and a tandem master cylinder 204. A brake switch 201 is used to indicate when a driver pushes on the brake pedal 202. A reservoir 205 is connected to the master cylinder 204 and holds a supply of brake fluid at atmospheric pressure. The tandem master cylinder 204 is connected to two similar but separate brake circuits 210a, 210b. For ease of description, only the components in circuit 210a will be discussed. The components of circuit 210b can be identical.

A non-driven wheel brake 206 and a driven wheel brake 207 are connected to the master cylinder 204 via brake fluid conduit 221. Conduit 221 divides into conduits 222 and 223. Conduit 225 is connected between conduit 222 and the outlet 211a of a pump 211. Conduit 224 is connected to conduit 225 and is attached to the non-driven wheel brake 206. Conduit 225 is connected to conduit 226 and conduit 226 is attached to driven wheel brake 207. Two-position, two-way normally open solenoid isolation valves 208 and 209 are located in conduits 224 and 226, respectively. Conduit 223 is connected to an inlet 211b of a pump 211. A two-position, two-way normally open pilot-operated supply valve 212 is located in conduit 223 between the master cylinder 204 and the pump 211.

Conduit 222 divides into conduits 228 and 232. Conduit 228 is connected to conduit 226 between the driven wheel isolation valve 209 and the driven wheel brake 207. A two-position, two-way normally open solenoid valve 213 is located in conduit 228 A one-way check valve 231 is located in conduit 228 which allows fluid to flow through conduit 228 from the driven wheel brake 207, through the normally open solenoid valve 213 and back toward the master cylinder 204, but not in the opposite direction. Conduit 232 is connected to conduit 224 between the non-driven wheel isolation valve 208 and the non-driven wheel brake 206. A one-way check valve 233 is located in conduit 232 which allows fluid to flow through conduit 232 from the non-driven wheel brake 206 back toward the master cylinder 204, but not in the opposite direction.

Conduit 227 is connected to the pump inlet 211b and a pump outlet 211a and contains a bypass valve 214. The bypass valve 214 allows fluid under high pressure to flow from the pump outlet 211a back to the pump inlet 211b. A low pressure accumulator (LPA) 217 located at the junction of conduits 223, 224 and 226 near the pump inlet 211b. A 2-position, 2-way normally closed solenoid dump valve 218, 219 is located in conduits 224 and 226, respectively, between respective wheel brakes 206, 207 and the low pressure accumulator 217. An electronic control unit (ECU) 229 is electrically connected to each solenoid valve and shuttles the appropriate valves when necessary during ABS or TC modes.

A check valve 250 is located between the supply valve 212 and pump inlet 211b and the LPA 217 for preventing fluid from the master cylinder 204 from flowing into the LPA 217. The check valve 250 allows fluid to flow from the LPA 217 to the pump inlet 211b.

A high pressure accumulator 260 is connected to conduit 227 near the pump outlet 211a. The high pressure accumulator 260 stores high pressure fluid delivered from the pump 211, and provides a sufficient volume of high pressure fluid against the check valve 240 to prevent the brake pedal 202 from dropping A small diameter orifice 262 is provided in conduit 227 adjacent the pump outlet 211a to attenuate pressure pulses produced during operation of the pump 211.

During a base brake apply the master cylinder 204 pressurizes brake fluid when the driver pushes the brake pedal 202. Pressurized fluid flows from the master cylinder 204 through conduits 221, 222, and 225, through the isolation valve 208 and conduit 224 into the non-driven wheel brake 206. Pressurized fluid also flows to the driven wheel brake 207 from conduit 225 through conduit 226 and the isolation valve 209. The pressurized brake fluid reaching the wheel brakes 206 and 207 applies the brakes and slows the vehicle. Pressurized fluid also closes pilot-operated valve 212, thereby preventing pressurized fluid from reaching the pump inlet 211b.

When the brake pedal 202 is released, the master cylinder 204 no longer pressurizes the brake fluid thus reducing the pressure at the wheel brakes 206 and 207. The reduction in brake pressure causes the fluid to return back to the master cylinder 204 and reservoir 205 through the check valves 231 and 233. Some fluid will also return to the master cylinder 204 and reservoir 205 through the isolation valves 208 and 209. Pressurized fluid at the non-driven wheel brake 206 returns through conduits 224 and 232, check valve 233, and conduits 222 and 221. Pressurized fluid at the driven wheel brake 207 returns through two paths. The first path includes conduit 226, isolation valve 209, conduits 225 and 224, isolation valve 208, check valve 233 and conduits 232, 222 and 221. The second path includes conduit 228, check valve 231, valve 213 and conduits 222 and 221.

During an ABS event, a dump mode is utilized to reduce pressure in the wheel brake of the slipping wheel. In an ABS dump mode, valve 212 is closed and valve 213 is open. Solenoid-operated isolation valves 208 and 209 are shuttled closed by the ECU 229. The solenoid-operated dump valve 218, 219 corresponding to the wheel brake 206, 207 of the slipping wheel is shuttled open. The pressurized fluid flows through the dump valve and into the low pressure accumulator 217. The ECU 229 also energizes motor 230 to drive the pump 211. The pump 211 runs throughout much of the ABS event. The pump 211 pumps fluid from the wheel brake 206, 207 of the slipping wheel and the low pressure accumulator 217 in a circular path through conduit 227 and the bypass valve 214.

In an ABS hold mode, the pressure at the wheel brakes 206, 207 is held constant. The valves 212 and 213 remain closed and open, respectively. Isolation valves 208 and 209 remain closed and the open dump valves 218, 219 are also shuttled closed by the ECU 229. The pump 211 continues to pump fluid, increasing the fluid pressure at the pump outlet 211a until the pressure relief valve 214 opens and the pump 211 pumps fluid in a circular path through conduit 227 and the bypass valve 214.

When the affected wheel has reached a predetermined slip level, the braking system 200 enters an ABS apply mode to begin braking the affected wheel again. In an ABS apply mode, the valves 212 and 213 remain closed and open, respectively. The isolation valve 208, 209 corresponding to the affected wheel is pulsed open to apply pressurized fluid to the affected wheel brake 206, 207. The isolation valve is pulsed open and closed increasing the pressure until the pressures in all of the affected wheel brakes are equalized with the master cylinder pressure concluding the ABS event or the wheel slips again and ABS dump mode is entered again to repeat the cycle.

When the driven wheel begins to slip during acceleration, a TC event occurs and braking pressure is applied to the slipping wheel. In a TC event, the ECU 229 energizes motor 230 which drives the pump 211. Typically, the driver does not apply the brakes while accelerating and the pilot-operated supply valve 212 remains open during traction control. The pump 211 draws fluid from the master cylinder 204 and reservoir 205 through the open supply valve 212 via conduits 221 and 223. Solenoid valve 213 is shuttled closed by the ECU 229 to isolate the pressurized fluid from the pump 211 at the driven wheel brake. Check valve 240 isolates the pump pressure from the master cylinder 204 preventing the pressure pulses from reaching the master cylinder 204 through conduit 225. Solenoid valve 208 is shuttled closed to prevent fluid flow back to the master cylinder 204 through the check valve 233. The pump outlet 211a communicates with the driven wheel brake 207 through line 226 and the open isolation valve 209. The dump valves 218, 219 are closed The isolation valve 209 controls the flow of pressurized fluid into the affected wheel brake until the proper driven wheel speed is obtained.

ATC hold mode isolates fluid pressure at the driven wheel brake by closing the driven wheel isolation valve 209 and keeping the dump valve 219 closed. Valves 208 and 213 continue to be actuated to the closed position If the pump pressure exceeds a predetermined pressure of approximately 2500 p.s.i., the bypass valve 214 opens to created a closed loop fluid path between the pump outlet 211a and pump inlet 211b and through conduit 227.

Pressure is relieved in the driven wheel brake 207 to decrease the braking force on the driven wheel during a TC dump mode. The driven wheel dump valve 219 is shuttled open and the isolation valve 209 is closed The excess fluid returns to the master cylinder 204 and reservoir 205 via conduits 223 and 221. The pump 211 continues to operate and if the pump pressure exceeds a predetermined pressure of approximately 2500 p.s.i., the bypass valve 214 opens to create the closed loop path from pump outlet 211a to pump inlet 211b described above.

The ABS/TC system 200 illustrated in FIG. 1 is a pedal isolated system A check valve 240 is positioned between the pump outlet 211a and the master cylinder 204. The check valve 240 prevents pressure pulsations produced by the pump 211 from reaching the master cylinder 204 and being transmitted to the driver via the brake pedal 202.

Figure 2:
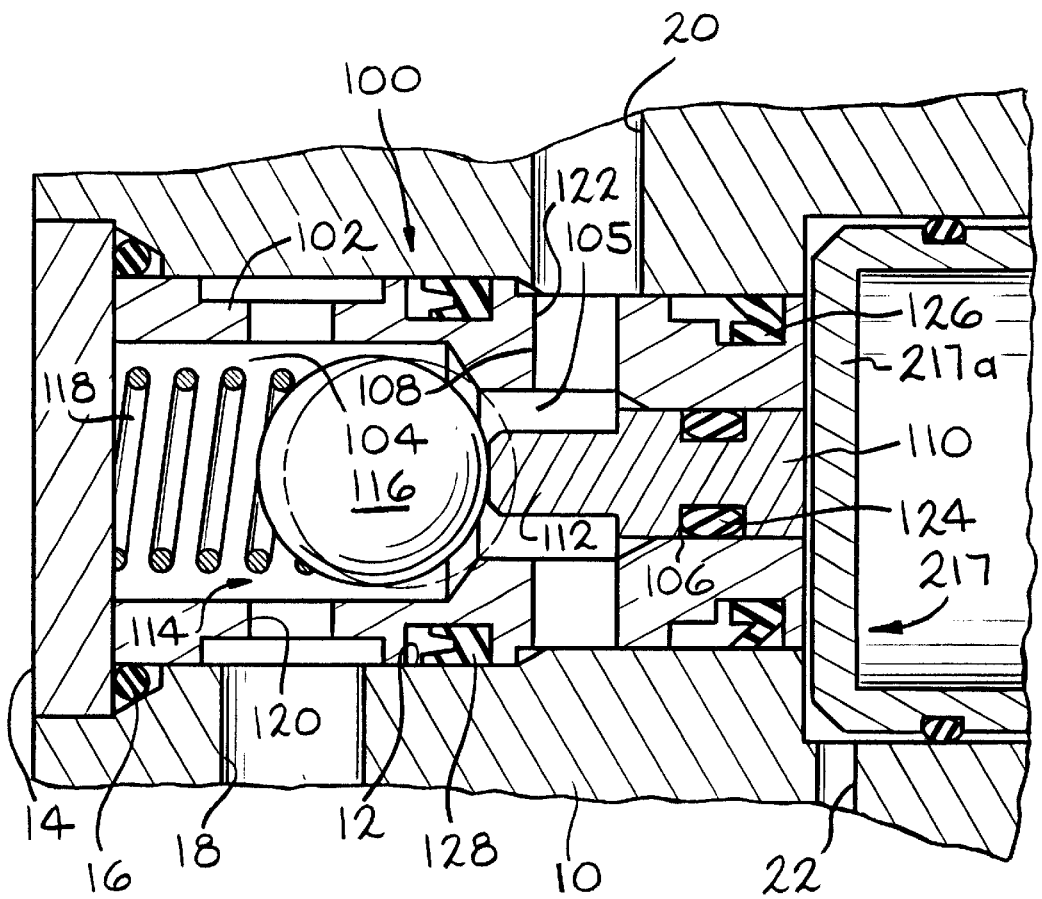
FIG. 2 is a sectional view of an integrated supply valve and check valve according to this invention mounted in a hydraulic control unit of the system of FIG. 1.

FIG. 2 illustrates a preferred embodiment of a supply valve 100 integrating the functions of the schematically-illustrated normally open supply valve 212 and check valve 250 of FIG. 1. In system 200, the supply valve 212 is located between the master cylinder 204 and the pump inlet 211b. The check valve 250 is located between the supply valve 212 and the pump inlet 211b and the LPA 217. The integrated supply valve 100 replaces the valves 212 and 250 in FIG. 1.

The integrated supply valve 100 is received in a bore 12 of a hydraulic control unit (HCU)10 which houses the various components of the system 200 including isolation valves, dump valves, LPA 217, and pump 211. The HCU 10 is formed as a housing and includes bores for receiving the components and fluid passageways for providing fluid communication between the components. The supply valve 100 is positioned between the LPA 217 at a first end and a sealing disc 14 at a second end. A seal 16 is provided between the disc 14, HCU 10 and the supply valve 100 to prevent the escape of brake fluid The supply valve 100 includes a generally cylindrical sleeve 102 having a stepped bore forming a first, relatively large diameter chamber 104, a second, intermediate chamber 105, and a third, relatively small diameter chamber 106. A valve seat 108 is formed at the intersection of the chambers 104 and 105. A piston 110 is slidably received in the small diameter chamber 106. The piston 110 includes a stem 112 projecting into the intermediate chamber 105 toward the valve seat 108. A valve element indicated generally at 114 is located in the large diameter chamber 104. The valve element 114 is illustrated as a ball or check element 116 biased by a spring 118 against the stem 112. As illustrated, the check ball 116 is normally pushed away from the valve seat 108 by the piston 110 which rests against a piston 217a of the LPA 217.

Openings 120 in the sleeve 102 adjacent the large diameter chamber 104 provide fluid communication between the large diameter chamber 104 and a passageway 18 in the HCU 10 connected to the master cylinder 204. Openings 122 in the sleeve 102 adjacent the intermediate chamber 105 provide fluid communication between the intermediate chamber 105 and a fluid passageway 20 in the HCU 10 connected to the pump inlet 211a In the normally open position of supply valve 100, fluid travels between the large and intermediate chambers 104 and 105.

An O-ring 124 is received in a groove on the outer diameter of the piston 110. A lip seal 126 is received in a groove on the outer diameter of the sleeve 102 between openings 122 and the LPA 217. A lip seal 128 is received in a groove on the outer diameter of the sleeve 102 between openings 122 and openings 120.

During base brake apply events having a master cylinder pressure below 500 p.s.i., the supply valve 100 remains open as illustrated and allows fluid to flow from the master cylinder 204 to the pump inlet 211a.

In base brake apply and ABS events having a master cylinder pressure above 500 p.s.i., the supply valve 100 closes as pressure induced forces move the check ball 116 to the right as shown in phantom.

When ABS is induced at master cylinder pressures below 500 p.s.i., the LPA 217 will begin to fill and movement of the LPA piston 217a to the right will cause the supply valve 100 to close. Fluid can pass from the LPA 217 to the pump inlet 211a pass the lip seal, thereby allowing for normal ABS pressure reapply. Fluid travels from dump valve 218 through fluid passageway 22 in the HCU 10 to the LPA 217, and from there past the lip seal 126. However, the nature of the lip seal 126 blocks or checks fluid from the pump inlet 211b and the supply valve 100 to the LPA 217. Thus, the lip seal 126 serves the function of the schematically illustrated check valve 250.

Figure 3:
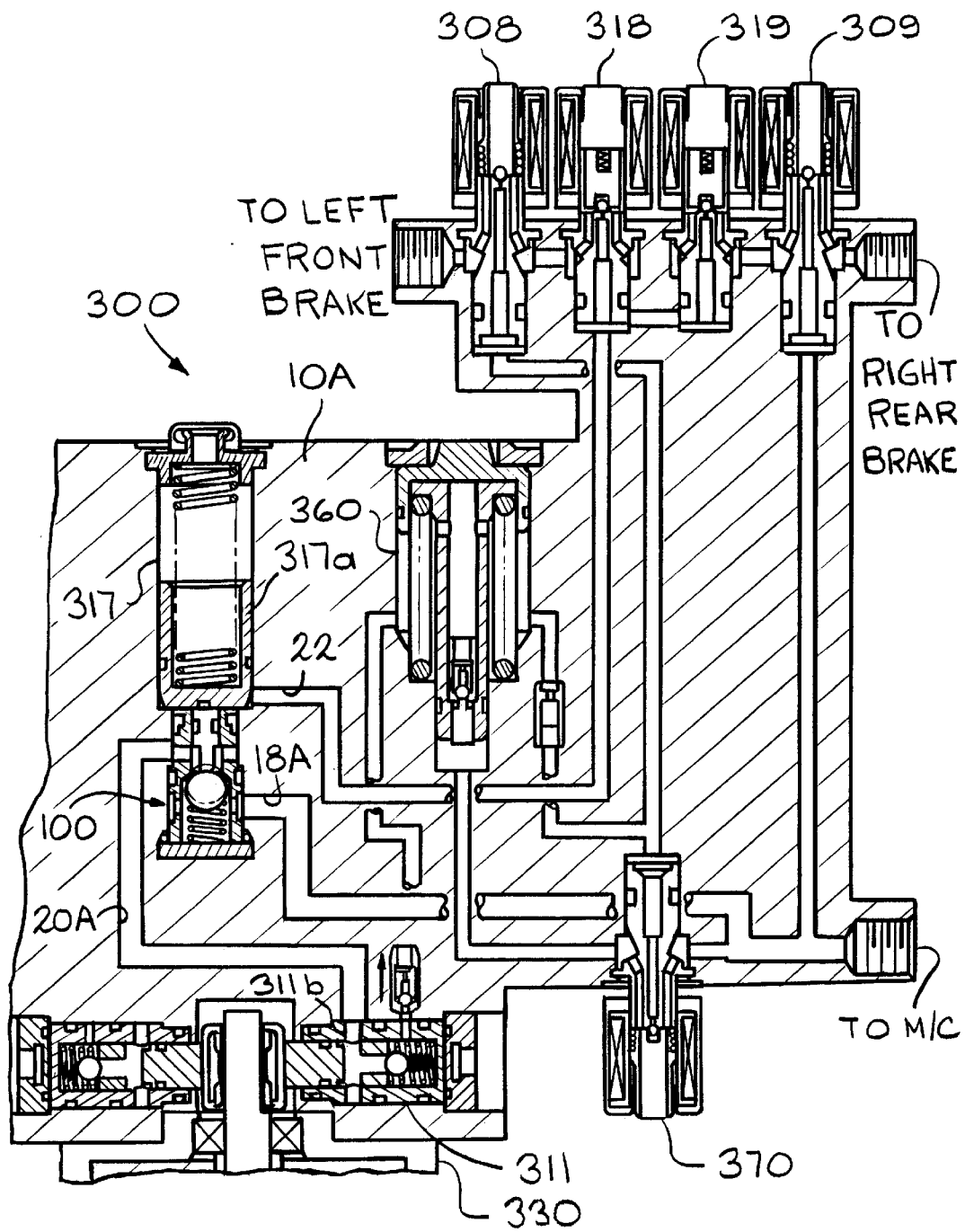
FIG. 3 is a sectional drawing of a portion of a hydraulic control unit of an alternate vehicular braking system containing the integrated supply valve and check valve of FIG. 2.

FIG. 3 illustrates a second vehicular braking system 300 in which the supply valve 100 can be utilized System 300 is a pedal feedback system (non pedal-isolated) and includes a hydraulic control unit 10A having isolation valves 308 and 309, dump valves 318 and 319, a low pressure accumulator 317, a high pressure accumulator/bypass 360, a TC isolation valve 370, a pump 311, and a motor 330. As shown, passageway 20A in the HCU 10A connects the supply valve 100 with a master cylinder (not illustrated in FIG. 3). Passageway 18A connects the supply valve 100 with the pump inlet 311b. The supply valve 100 functions in system 300 in a similar manner to its function in system 200 described above.

The supply valve 100 is discussed and/or illustrated in two representative vehicular braking systems 200 and 300. Additionally, the supply valve 100 can be used in other conventional vehicular braking systems.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. A supply valve for use in a vehicular braking system including a master cylinder, a pump, and a low pressure accumulator, the supply valve comprising:

a housing;

a sleeve disposed within the housing;

ports provided in the sleeve to provide fluid communication between the low pressure accumulator and the pump;

a piston slidably disposed within the sleeve;

a valve element disposed within the sleeve including a valve seat and check element for sealing against the valve seat to close the valve element; and a lip seal disposed on the sleeve for allowing fluid to flow from the low pressure accumulator to the pump but not in the opposite direction.

2. The supply valve defined in claim 1 wherein the check element is a ball.

3. The supply valve defined in claim 2 wherein a spring biases the ball against the piston.

4. The supply valve defined in claim 1 wherein the supply valve is received in a bore of a hydraulic control unit having fluid passageways connecting the supply valve to the low pressure accumulator and to the pump.

5. The supply valve defined in claim 1 wherein a stepped bore in the sleeve receives the valve element and the piston.

6. The supply valve defined in claim 5 wherein the valve seat is formed by the stepped bore.

7. The supply valve defined in claim 6 wherein the stepped bore forms a first, relatively large diameter chamber, a second, intermediate chamber, and a third, relatively small diameter chamber such that the valve seat is formed adjacent the intersection of the first and second chambers.

8. A hydraulic control unit for a vehicular braking system comprising:

a housing having a bore;

a normally open supply valve disposed within bore of the housing;

fluid passageways formed in the housing providing fluid communication from the supply valve to a low pressure accumulator and a pump; and the supply valve including a lip seal for providing one-way fluid flow from the low pressure accumulator past the supply valve to the pump, and a sleeve, disposed in the bore, having ports to provide fluid communication between the low pressure accumulator and the pump.

9. The hydraulic control unit defined in claim 8 wherein the supply valve includes a check element for sealing against the valve seat to close the supply valve.

10. The hydraulic control unit defined in claim 9 wherein the check element is a ball.

11. The hydraulic control unit defined in claim 9 wherein a spring biases the ball against a piston.

12. A vehicular braking system for hydraulically actuated wheel brakes comprising:

a master cylinder;

a pump;

a low pressure accumulator; and a supply valve connected between the master cylinder and the pump and the low pressure accumulator, wherein the supply valve includes a sleeve having ports to provide fluid communication between the low pressure accumulator and the pump so that fluid can flow past a lip seal of the supply valve from the low pressure accumulator to the pump.

13. The vehicular braking system defined in claim 12 wherein the supply valve is normally open and where fluid can flow past the lip seal when the supply valve is closed.

14. The vehicular braking system defined in claim 12 wherein the supply valve includes:

a housing having a bore, wherein the sleeve is disposed within the bore of the housing;

a valve element disposed within the sleeve; and the lip seal is disposed on the sleeve.

15. The vehicular braking system defined in claim 14 wherein the valve element is a check ball and a valve seat.

16. The vehicular braking system defined in claim 15 including a spring biasing the check ball against a spring.

* * * * *